United States Patent [19]
Perlov et al.

[11] Patent Number: 4,897,749
[45] Date of Patent: Jan. 30, 1990

[54] COMBINATION PROBE AND RING HEAD FOR VERTICAL RECORDING

[75] Inventors: Craig M. Perlov, Los Altos, Calif.; Peter K. George, Bloomington; Mark Jursich, Prior Lake, both of Minn.

[73] Assignee: Magnetic Peripherals Inc., Minnetonka, Minn.

[21] Appl. No.: 168,820

[22] Filed: Mar. 16, 1988

[51] Int. Cl.$^4$ .................. G11B 5/127; G11B 5/187
[52] U.S. Cl. .................. 360/126; 360/121; 360/122
[58] Field of Search ............. 360/126, 121, 122, 123, 360/124, 125

[56] References Cited

U.S. PATENT DOCUMENTS

| | | | |
|---|---|---|---|
| 3,394,361 | 7/1968 | Hahs | 360/125 |
| 3,639,699 | 2/1972 | Tieman | 360/126 |
| 3,867,368 | 2/1975 | Lazzari | 360/126 |
| 4,210,946 | 7/1980 | Iwasaki et al. | 360/131 |
| 4,277,809 | 7/1981 | Fisher et al. | 360/131 |
| 4,404,609 | 9/1983 | Jones, Jr. | 360/126 |
| 4,639,811 | 1/1987 | Diepers et al. | 360/125 |
| 4,644,432 | 2/1987 | Heim | 360/123 |
| 4,652,957 | 3/1987 | Schewe et al. | 360/125 |
| 4,672,493 | 5/1987 | Schewe | 360/125 |

FOREIGN PATENT DOCUMENTS 3424651 5/1985 Fed. Rep. of Germany ...... 360/123

Primary Examiner—John H. Wolff
Assistant Examiner—David J. Severin
Attorney, Agent, or Firm—Edward P. Heller, III

[57] ABSTRACT

A vertically recording write probe and read ring head. A ring pole is mounted adjacent a vertical recording probe pole. The ring pole tip is made thin such that it saturates on write and does not affect performance of the probe pole. The ring pole tip is separated from the probe tip by a small read gap. The probe pole and ring pole are connected in a back gap region so that the combination reads like a conventional read head.

2 Claims, 3 Drawing Sheets

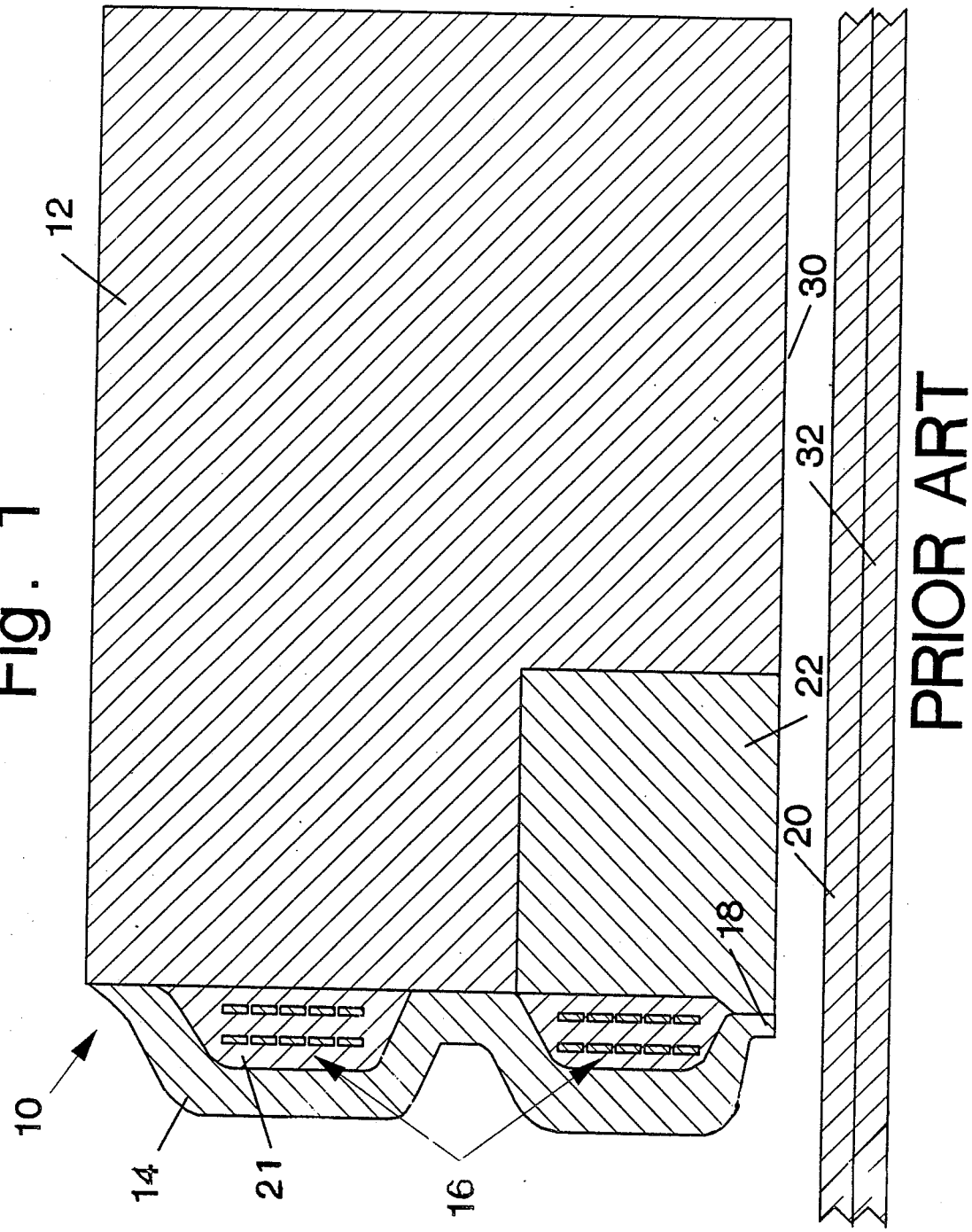

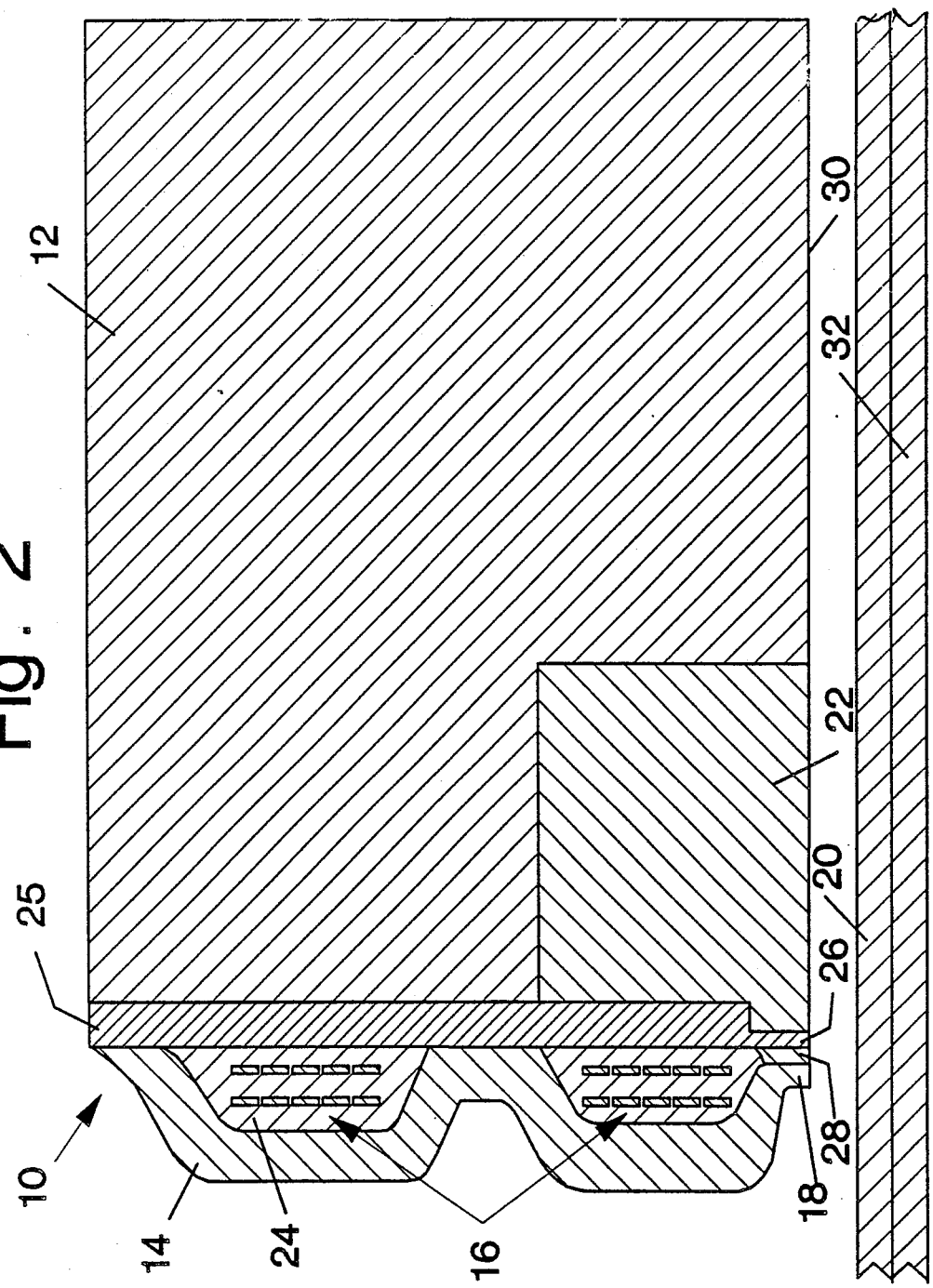

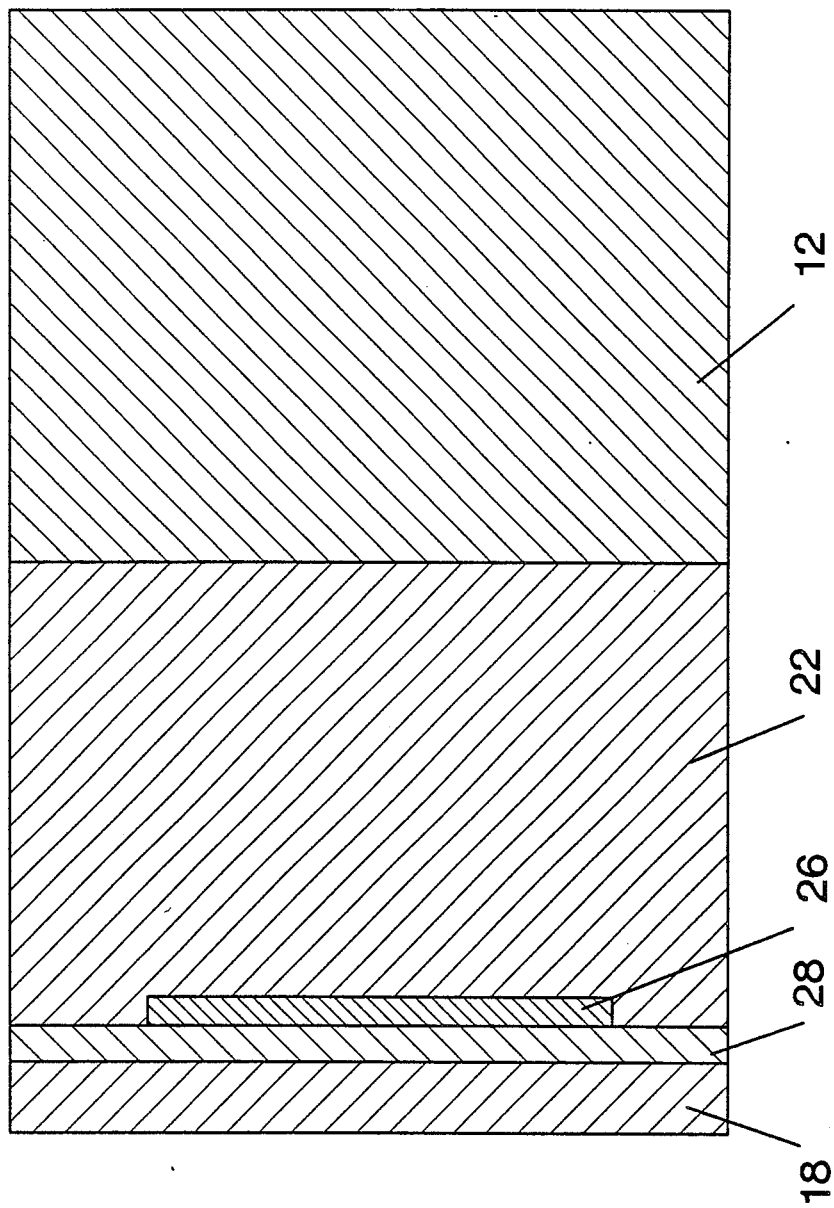

COMBINATION PROBE AND RING HEAD FOR VERTICAL RECORDING

BACKGROUND OF THE INVENTION

1. FIELD OF THE INVENTION

The invention relates to the field of magnetic recording heads, especially, vertical recording heads.

2. BRIEF DESCRIPTION OF THE PRIOR ART

Recently developed, single-sided, vertical recording, probe heads have a narrow, Permalloy, trailing probe pole and a broad ferrite flux return path spaced some distance away from the probe pole so that the trailing edge magnetic field orientation is concentrated and vertical. A typical arrangement is shown in FIG. 1 (PRIOR ART).

In this figure, head 10 flies on an air bearing a short distance above media 20. The head has a trailing probe pole 14 composed of a highly magnetically permeable material such as found in the Permalloy family. The probe pole 14 is mounted on a ferrite substrate 12, which also forms the part of the flux path. At the air bearing surface 30 facing the media 20, a wide gap 22 is formed between the probe pole 14 and ferrite 12. This is conventionally filled with a non magnetic filler such as glass. Coils 16 are mounted in a gap 24, conventionally filled with non magnetic photoresist. The coils provide magnetic flux for writing and sense magnetic flux for reading. The flux path is closed by magnetically permeable underlayer 32.

A problem in this design is that it is inefficient for reading. The probe tip 18 is made relatively thick to avoid saturation and to provide a high magnetic field gradient for narrow magnetization transitions and acceptable overwrite. However, on readback, it is desirable to have a thin, narrow tip to increase resolution for acceptable high density performance.

U.S. Pat. No. 4,639,811 discloses a two-pole, single-gap, two-coil, vertical-recording, read-ring head, one pole of which saturates on writing. No write flux return path is provided, which makes the head inefficient for writing and undoubtedly accounts for the separate write coil.

SUMMARY OF THE INVENTION

The invention comprises the addition of a "ring" pole connected to the probe pole 14 in a back gap region and having a thin, narrow tip spaced from the probe tip 18 a short distance to provide a high resolution read gap at the air bearing surface. The ring pole tip saturates on writing because it is thin and does not affect the performance of the probe pole. The probe pole and ring pole combine to function as a high resolution read ring head.

BRIEF DESCRIPTION OF THE DRAWINGS

FIG. 1 is a cross section of a prior art single-side probe head.

FIG. 2 is a cross section of a probe/ring head according to the present invention.

FIG. 3 is a bottom plan view of the probe/ring head.

DESCRIPTION OF THE PREFERRED EMBODIMENT

All the elements of the probe/ring head of the preferred embodiment are the same as shown in FIG. 1 save for the addition of a third, highly permeable, magnetic ring pole 25 adjacent the probe pole 14. This is shown in FIGS. 2 and 3. Here the ring pole 25 is mounted on ferrite substrate 12 and probe pole 14 in turn is mounted on the ring pole 25. They are thereby connected in the back gap region such that flux flowing from the ring pole 25 to probe pole 14 is sensed by coils 16.

At the air bearing surface ("ABS") 30 facing media 20, the ring pole tip 26 is made as thin as possible to so that it saturates on writing but conducts an acceptable amount of read flux on reading. The material of ring pole 26 is preferably of the Permalloy family.

The ring pole tip 26 is spaced at the ABS a short distance from probe tip 18 to provide a small read gap 28. The gap 28 is filled with a non magnetic material, preferably the same as that which fills gap 22.

As can be seen in FIG. 3 (a view from the media of the bottom of head 10), the ring pole tip 26 is made narrower (transverse the direction of motion) than probe pole 14. This provides for higher tracking precision and reduced cross talk via a write wide (pole tip 18) read narrow (pole tip 26) configuration.

During write operations, the ring pole tip 26 quickly saturates and the closely spaced probe continues to provide high gradient, concentrated, vertically oriented flux.

During read operations, the combination of probe pole 14, ring pole 25, gap 28 and coils 16 act like a conventional narrow-gap ring head.

The ferrite "pole" provides and additional flux path to coils 16 on read. However the effect is negligible because the flux path through the ferrite is much longer. The flux path is longer because the large gap 22 spaces the ferrite "pole" far from either probe tip 18 or ring pole tip 26. Moreover, because of the long path and the relatively long ferrite surface, high density transitions cancel one another. The net effect of the ferrite flux return path is low level noise.

In an alternative arrangement (not shown), the ferrite may be slightly recessed from the ABS to reduce read flux pickup without significantly degrading Write performance.

We claim:

1. Apparatus for writing and reading magnetic flux from a recording surface comprising:

a recording medium having a magnetically permeable underlayer;

a ferrite substrate having a long surface facing said recording medium opposite said underlayer and movable in a direction of motion relative to the recording medium;

a highly permeable ring pole mounted on the ferrite substrate; the ring pole having a tip facing the recording medium; the tip being sufficiently thin in said direction of motion that it saturates during write operations;

a highly permeable probe pole mounted on said ring pole and magnetically connected in a back gap region; the probe pole having a tip facing the medium; the tip having a predetermined thickness in the direction of motion head greater than the thickness of the ring pole but less thick than the length of said ferrite facing surface;

a read gap between said ring pole tip and said probe tip in said direction of motion; and a large gap formed between said ring pole tip and said facing ferrite surface; whereby during write operations, flux is closed through said probe tip, vertically through said medium to said underlayer, through the underlayer to said long facing ferrite surface, and back through the ferrite substrate and ring pole to the probe pole; and whereby during read operation flux is closed across said read gap and through said probe pole and ring pole.

2. Apparatus according to claim 1 wherein said ring pole tip is narrower than said probe tip in a direction transverse to said direction of motion.

* * * * *